3,253,008
NITROGEN-SILICON COMPOUNDS
Walter Fink, Zurich, Switzerland, assignor to Monsanto Company, a corporation of Delaware
No Drawing. Filed Nov. 6, 1961, Ser. No. 150,210
Claims priority, application Switzerland, Nov. 11, 1960, 12,674/60
9 Claims. (Cl. 260—448.2)

The present invention is concerned with novel nitrogen-silicon compounds of the general formula

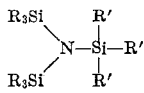

In this formula R and R' signify identical or different aliphatic, cycloaliphatic, araliphatic, aromatic or heterocyclic radicals, which possibly are fluoroinated. R' moreover is a halogen atom or a (R₃Si)₂N-group. Two adjacent radicals R or R' can also be joined to form a heterocyclic ring of silicon and 3 to 7 methylene groups. It is preferred that R and R' as hydrocarbon radicals contain not more than about 18 carbon atoms and more preferably not more than about 8 carbon atoms.

The novel compounds are obtained by reacting silicon halides or organosilicon halides which contain radicals as mentioned, and a salt of disilazane according to the scheme

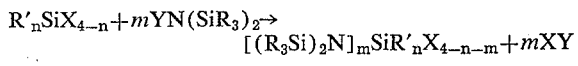

In this scheme R and R' have the significance defined before, X is a halogen atom, preferably a chlorine, bromine and/or fluorine atom, Y is an alkali metal atom, preferably a lithium atom, or is a radical which forms a Grignard compound, $n$ is zero, 1, 2 or 3 and $m$ is 1, 2, 3 or 4. It is clear that instead of halides other salts of silicon or organosilicons such as sulfate, nitrate etc., can also be used in the reaction. But, from the technical point of view the easy available halides are generally preferred.

Examples of suitable silicon halides are: SiCl₄, SiBr₄, SiF, SiFCl₃, SiF₂Cl₂, SiF₃Cl, SiFBr₃, SiF₂Br₂, SiF₃Br, etc. Furthermore, the corresponding organic substituted silicon halides such as mono, di and tri-alkyl, -aralkyl, -aryl, -cycloalkyl and -heterocycloalkyl silicon halides, thereby the silicon atom may also be a part of a heterocyclic ring. The fluorinated lower aliphatic radicals such as —CF₃, —CF₂CF₃, —CH₂CF₃ etc., or the perfluorinated aromatic radicals such as C₆F₅ etc., are especially important in the preparation of high temperature resistant compounds. A lower aliphatic radical is one containing not more than 8 carbon atoms.

The disilazane salts serving as starting products are obtained in usual manner from, for example, organic substituted silicon halides and ammonia and conversion of the formed disilazane R₃SiNHSiR₃ to an alkali metal compound R₃SiNLiSiR₃ or to a Grignard compound

Examples of disilazanes which are fit for the reaction are: bi-(trimethylsilazane), bi-(triethylsilazane), bi-(tripropylsilazane), bi-(tributylsilazane), bi-(trilaurylsilazane), bi-(tricyclohexylsilazane), bi-(tribenzylsilazane), bi-(tri-α-methylbenzylsilazane), bi-(triphenylsilazane) etc.; furthermore, fluorinated derivatives, especially bi-(triperfluoromethylsilazane), bi-(tri-perfluoroethylsilazane), bi-(tri-β-trifluoroethylsilazane), bi - (triperfluorophenylsilazane) etc.

It is clear that unsymmetrically substituted organo-silicon halides and organosilazanes can also be used, thereby in the latter case may be attached either to the same silicon atom and/or to both the silicon atoms differents of the enumerated substituents.

Only one corresponding nitrogen-silicon compound having the formula N[Si(CH₃)₃]₃ has been reported in the literature (Goubeau, Jiménez-barbera, Z. Anorg. Allg. Chem. 303, 217, 1960). This compound has been obtained from trimethylsilicon chloride and either the lithium salt of bi-(trimethylsilazane) by application of pressure or the correspondingly prepared sodium salt without application of pressure. On the contrary, it was found that this compound can also be prepared from the lithium salt or Grignard compound of the bi-(trimethylsilazane) without application of pressure.

According to the present invention, new compounds can be prepared which on a silicon atom possess, for example, up to four (R₃Si)₂N— groups:

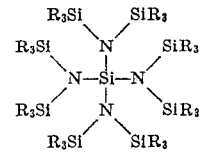

The compounds showing besides at least one (R₃Si)₂N— group one or several halogen atoms attached to the silicon atom and which can be hydrolyzed, should particularly be mentioned. The compounds of this type can be converted in known manner to the corresponding organosilazane silanols, or to their condensation products respectively. According as one, two or three halogen atoms, which can be hydrolyzed, are present, there can be obtained one of the compounds having the following structural formula:

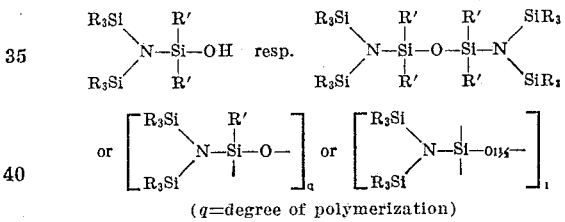

($q$=degree of polymerization)

The manufacture of the nitrogen-silicon compounds of the present invention is carried out in simple manner by mixing the reactants in calculated proportions, wherein a prolonged heating, possibly in an autoclave, may be necessary according to the reactivity of the possibly organically substituted silicon halides or to the number and kind of halogen atoms to be replaced. The reaction can be carried out with or without a solvent. But, in general one works conveniently without a solvent.

It was found that the Grignard compounds of the respective organodisilazanes can also be prepared. These compounds show a noteworthy stability and can be isolated and stored in the form of a solvent-free powd^r The resulting compounds are liquid or solid according to the organic groups present. Depending on the circumstances, in the purification it may be sufficient to eliminate the co-formed alkali or magnesium salts by filtration or, when the compounds are resistant towards hydrolysis, also by washing out with water.

The products can be used as heat-transferring agents at high temperatures, lubricants for machine parts which are thermically highly stressed, hydraulics, auxiliary agents for textiles, anti-foaming agents, anti-oxidants, stabilizers, accelerators in vulcanization, plasticizers, hydrophobic agents, flame-proofing agents, etc. The polymeric products can be used as lacquers and in the form of foils, fibers and molded articles. So far as halogen atoms are present, which are attached to silicon and which are replaceable, the products are valuable intermediates; they can be converted by, for example, hydrolysis with calculated amount of water in known manner to the corresponding nitrogen-containing organosilanols or organosiloxanes respectively.

*Example 1*

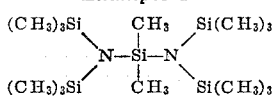

A mixture of $(CH_3)_2SiCl_2$ and $[(CH_3)_3Si]_2NLi$ in a molar ratio of 1:2 is heated at 190° C. in an autoclave for 20 hours. Then, the reaction product is fractionally distilled. Yield 83.5% of waxy substance; M.P. 79–81° C.; B.P. 116–117° C./$1.5 \times 10^{-2}$ mm.

Analysis:

| $C_{14}H_{42}N_2Si_5$ | Calculated | Found |
|---|---|---|
| Molecular weight | 378 | 396 |
| Percent C | 44.8 | 45.01 |
| Percent H | 11.19 | 11.0 |
| Percent N | 7.41 | 7.55 |

Infra-red spectrum (cm.$^{-1}$) 2965 (st) 2900 (st) 1405 (m) 1265 (st) 900 (st) 867 (m) 843 (w) 800 (w) 765 (w) 675 (st).

*Example 2*

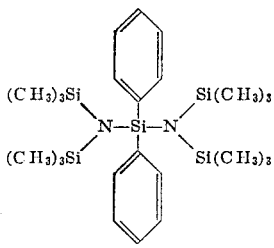

A mixture of $(C_6H_5)_2SiCl_2$ and $[(CH_3)_3Si]_2NMgBr$ is heated in a molar ratio of 1:2 at 190° C. in an autoclave for 20 hours. Then, the reaction mixture is fractionally distilled. Yield 63% of oily liquid; B.P. 135.5–136.5° C./$9.0 \times 10^{-2}$ mm., 316.1° C./723.5 mm.; $n_D^{20}$ 1.5425.

*Example 3*

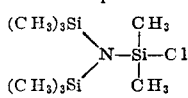

A mixture of $(CH_3)_2SiCl_2$ and $[(CH_3)_3Si]_2NLi$ is heated in a molar ratio of 1:1 at 220° C. for 5 hours. Then, the reaction mixture is fractionally distilled. Yield 75% of waxy substance; M.P. 54–56° C., B.P. 218–219° C./717 mm.; $n_D^{50}$ 1.430.

Analysis:

| $C_8H_{24}NSi_3Cl$ | Calculated | Found |
|---|---|---|
| Molecular weight | 253.99 | 272.0 |
| Percent C | 37.84 | 37.90 |
| Percent H | 9.52 | 8.84 |
| Percent N | 5.55 | 5.59 |

Infra-red spectrum (cm.$^{-1}$) 2990 (st) 2930 (m) 1410 (m) 1260 (st) 940 (st) 895 (st) 845 (st) 660 (st).

*Example 4*

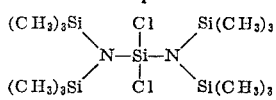

A mixture of $SiCl_4$ and $[(CH_3)_3Si]_2NLi$ is heated in a molar ratio of 1:2 at 200° for 2 hours. Then, the reaction mixture is fractionally distilled. Yield 70% of waxy substance; M.P. 59–64° C., B.P. 227–228° C./725 mm.; $n_D^{50}$ 1.4618.

Analysis:

| $C_{12}H_{36}N_2Si_5Cl_2$ | Calculated | Found |
|---|---|---|
| Percent C | 34.33 | 34.74 |
| Percent H | 8.64 | 8.59 |

Infra-red spectrum (cm.$^{-1}$) 2960 (st) 1410 (m) 1257 (st) 1030 (m) 975 (st) 852 (st) 765 (w) 677 (m).

*Example 5*

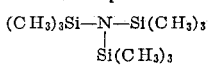

A mixture of $(CH_3)_3SiCl$ and $[(CH_3)_3Si]_2NLi$ in a molar ratio of 1:1 is heated at 140° C. (bath temperature) using a reflux condenser. The cold reaction mixture is poured into water and the precipitated oil is separated, dried with sodium sulfate and distilled. Yield 88% ow waxy substance; M.P. 70–71° C., B.P. 76° C./12 mm.

Analysis:

| $C_9H_{27}NSi_3$ | Calculated | Found |
|---|---|---|
| Percent C | 46.28 | 47.1 |
| Percent H | 11.65 | 12.2 |
| Percent N | 5.99 | 5.8 |

*Example 6*

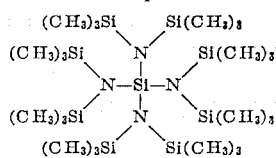

A mixture of $SiCl_4$ and $[(CH_3)_3Si]_2NLi$ in a molar ratio of 1:4 is heated in an autoclave for 10 hours. Then, the reaction mixture is fractionally distilled. Yield 81%; B.P. 124–126.5° C./$8.0 \times 10^{-2}$ mm.

Analysis:

| $C_{24}H_{72}N_4Si_9$ | Calculated | Found |
|---|---|---|
| Molecular weight | 669.7 | 623 |
| Percent N | 8.41 | 8.20 |

*Example 7*

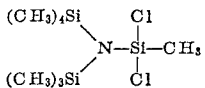

A mixture of 45.6 g. (0.305 mole) $CH_3SiCl_2$ and of 51.1 g. (0.305 mole) $[(CH_3)_3Si]_2NLi$ is heated in 100 ml. of xylene at 125–140° C. for 8 hours. Then, the reaction product is fractionally distilled. Yield 72.6 g. (=86.2% of the theory); M.P. 73° C., B.P. 100–101° C./14 mm.

Analysis:

| $C_7H_{21}NSi_3Cl_2$ | Calculated | Found |
|---|---|---|
| Mol. weight | 274.4 | 284.5 |
| Percent N | 5.13 | 5.10 |

What is claimed is:
1. A compound selected from the compounds of the formulae $[(R_3Si)_2N]_2Si(R)_2$, $(R_3Si)_2NSiCl(R)_2$,

$$[(R_3Si)_2N]_2SiCl_2$$

$[(R_3Si)_2N]_4Si$, and $(R_3Si)_2NSiCl_2R$ wherein R is selected from the class consisting of hydrocarbon radicals having not more than 8 carbon atoms, a fluorinated phenyl group and a fluorinated alkyl group having from 1 to 2 carbon atoms.

2. A compound of the formula $[(R_3Si)_2N]_2Si(CH_3)_2$ wherein R is an alkyl group having not more than 8 carbon atoms.

3. A compound of the formula $[(R_3Si)_2N]_2Si(R')_2$ wherein R' is the phenyl group and R is an alkyl group having not more than 8 carbon atoms.

4. A compound of the formula $(R_3Si)_2NSiCl(CH_3)_2$ wherein R is an alkyl group having not more than 8 carbon atoms.

5. A compound of the formula $[(R_3Si)_2N]_2SiCl_2$ wherein R is an alkyl group having not more than 8 carbon atoms.

6. A compound of the formula $[(R_3Si)_2N]_4Si$ wherein R is an alkyl group having not more than 8 carbon atoms.

7. A compound of the formula $(R_3Si)_2NSiCl_2CH_3$ wherein R is an alkyl group having not more than 8 carbon atoms.

8. A compound of the formula $(R_3Si)_2NSiCl_2CH_3$ wherein R is a fluorinated phenyl group.

9. A compound of the formula $(R_3Si)_2NSiCl_2CH_3$ wherein R is a fluorinated alkyl group having from 1 to 2 carbon atoms.

References Cited by the Examiner

UNITED STATES PATENTS 3,046,292   7/1962   Pike _____ 260—448.2

OTHER REFERENCES

Goubeau et al.: "Zeitschrift für Anorganische und Allgemeine Chemie," vol. 303 (1960), pp. 217–26.

Niederprum: "Beitrage zur Kennthis der Silicium-Stickstoff-Verbindungen," Dissertation submitted to the Rheinisch-Westfalischen Technischen Hochschule, Aachen, Germany, November 9, 1960; title pages and page 46–88 only needed.

Wannagat et al.: Ibid, vol. 308 (March 1961), pp. 337–51 (Chem. Abstracts, vol. 55 (1961), col. 24540–1).

TOBIAS E. LEVOW, *Primary Examiner.*

ALPHONSO D. SULLIVAN, SAMUEL H. BLECH,
*Examiners.*